(12) United States Patent  
Shen et al.

(10) Patent No.: US 11,777,847 B1  
(45) Date of Patent: Oct. 3, 2023

(54) POINT-TO-MULTIPOINT TRANSPORT CHAIN

(71) Applicant: Juniper Networks, Inc., Sunnyvale, CA (US)

(72) Inventors: Yimin Shen, Sherborn, MA (US); Zhaohui Zhang, Westford, MA (US); Alexander Arseniev, Ras al Khaimah (AE); Ronald Bonica, Sterling, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 99 days.

(21) Appl. No.: 17/100,602

(22) Filed: Nov. 20, 2020

Related U.S. Application Data

(60) Provisional application No. 62/975,374, filed on Feb. 12, 2020.

(51) Int. Cl.
*H04L 45/00* (2022.01)
*H04L 45/16* (2022.01)
*H04L 69/22* (2022.01)
*H04L 45/50* (2022.01)
*H04L 101/659* (2022.01)

(52) U.S. Cl.
CPC ............ *H04L 45/566* (2013.01); *H04L 45/16* (2013.01); *H04L 45/50* (2013.01); *H04L 69/22* (2013.01); *H04L 2101/659* (2022.05)

(58) Field of Classification Search
None
See application file for complete search history.

(56) References Cited

U.S. PATENT DOCUMENTS

| | | | | |
|---|---|---|---|---|
| 10,158,558 | B1* | 12/2018 | Ward | H04L 45/16 |
| 11,290,394 | B2* | 3/2022 | Radhakrishnan | H04L 12/66 |
| 2012/0236860 | A1* | 9/2012 | Kompella | H04L 45/28 370/392 |
| 2017/0005920 | A1* | 1/2017 | Previdi | H04L 45/507 |
| 2020/0162375 | A1* | 5/2020 | Chen | H04L 41/5009 |
| 2020/0358698 | A1* | 11/2020 | Song | H04L 45/34 |
| 2021/0092043 | A1* | 3/2021 | Filsfils | H04L 61/2007 |

(Continued)

OTHER PUBLICATIONS

Rosen, E., et al. "RFC3032: MPLS Label Stack Encoding." (2001).*

(Continued)

*Primary Examiner* — Brian Whipple
(74) *Attorney, Agent, or Firm* — Harrity & Harrity, LLP

(57) ABSTRACT

A network node may receive a packet that originated from a root network node and may process the packet to determine segment identifier (SID) information associated with a point-to-multipoint transport chain. The network node may determine, based on the SID information, that the network node is a transit leaf node in the point-to-multipoint transport chain. The network node may generate, based on determining that the network node is a transit leaf node in the point-to-multipoint transport chain, a copy of the packet and may process the copy of the packet to perform one or more actions. The network node may update, based on determining that the network node is a transit leaf node in the point-to-multipoint transport chain, the SID information and may send, after updating the SID information, the packet, with the updated SID information, to another network node.

20 Claims, 12 Drawing Sheets

(56) References Cited

U.S. PATENT DOCUMENTS

2021/0119914 A1* 4/2021 Busi .................. H04L 45/20
2021/0377173 A1* 12/2021 Zhang ................ H04L 45/50
2021/0409312 A1* 12/2021 Chen ................. H04L 12/4633

OTHER PUBLICATIONS

Shen, et al.; "Point-to-Multipoint Transport Using Chain Replication in Segment Routing draft-she-spring-p2mp-transport-chain-03"; NTT Communications; Oct. 21, 2020; 14 pages.

* cited by examiner

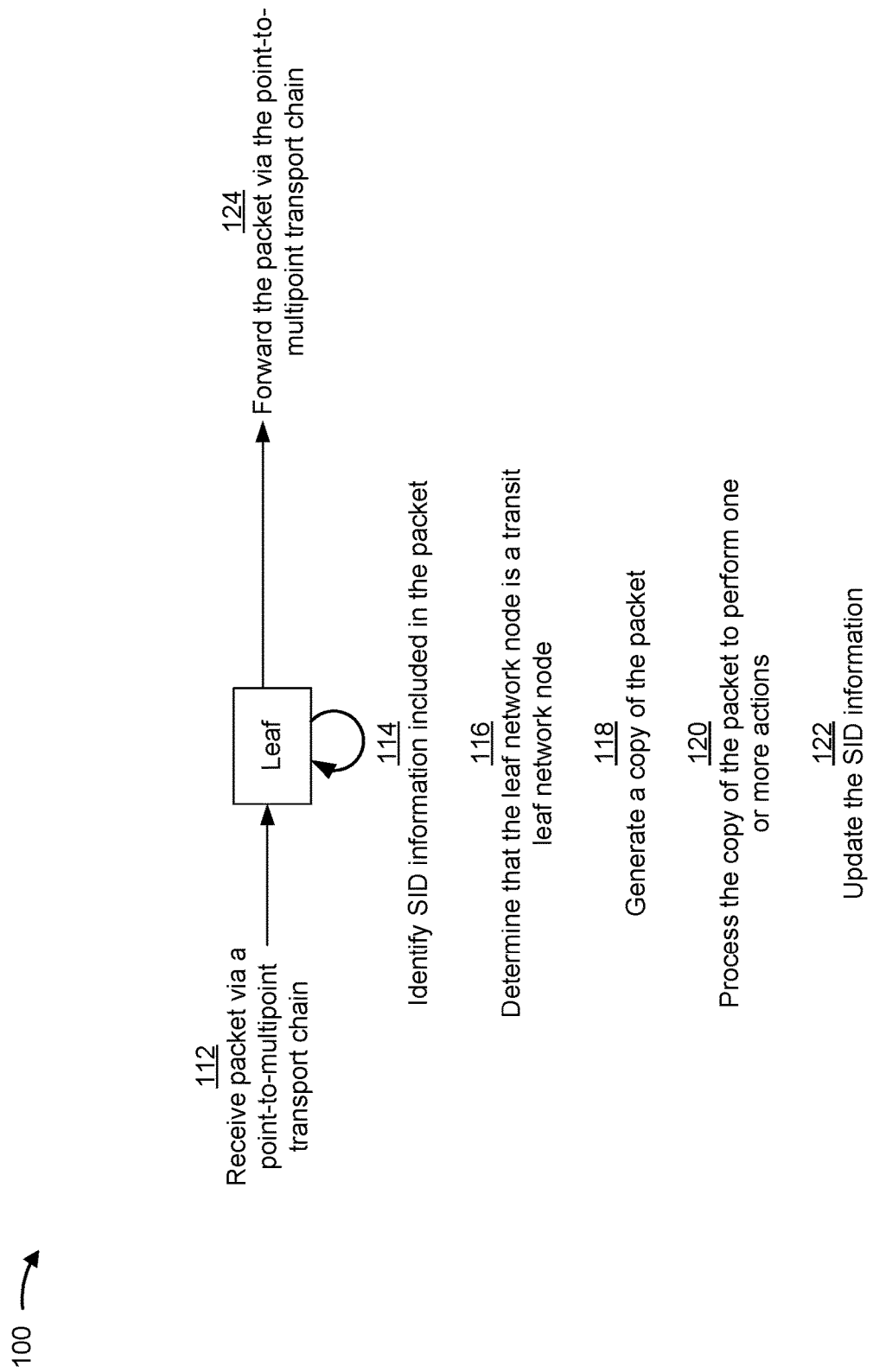

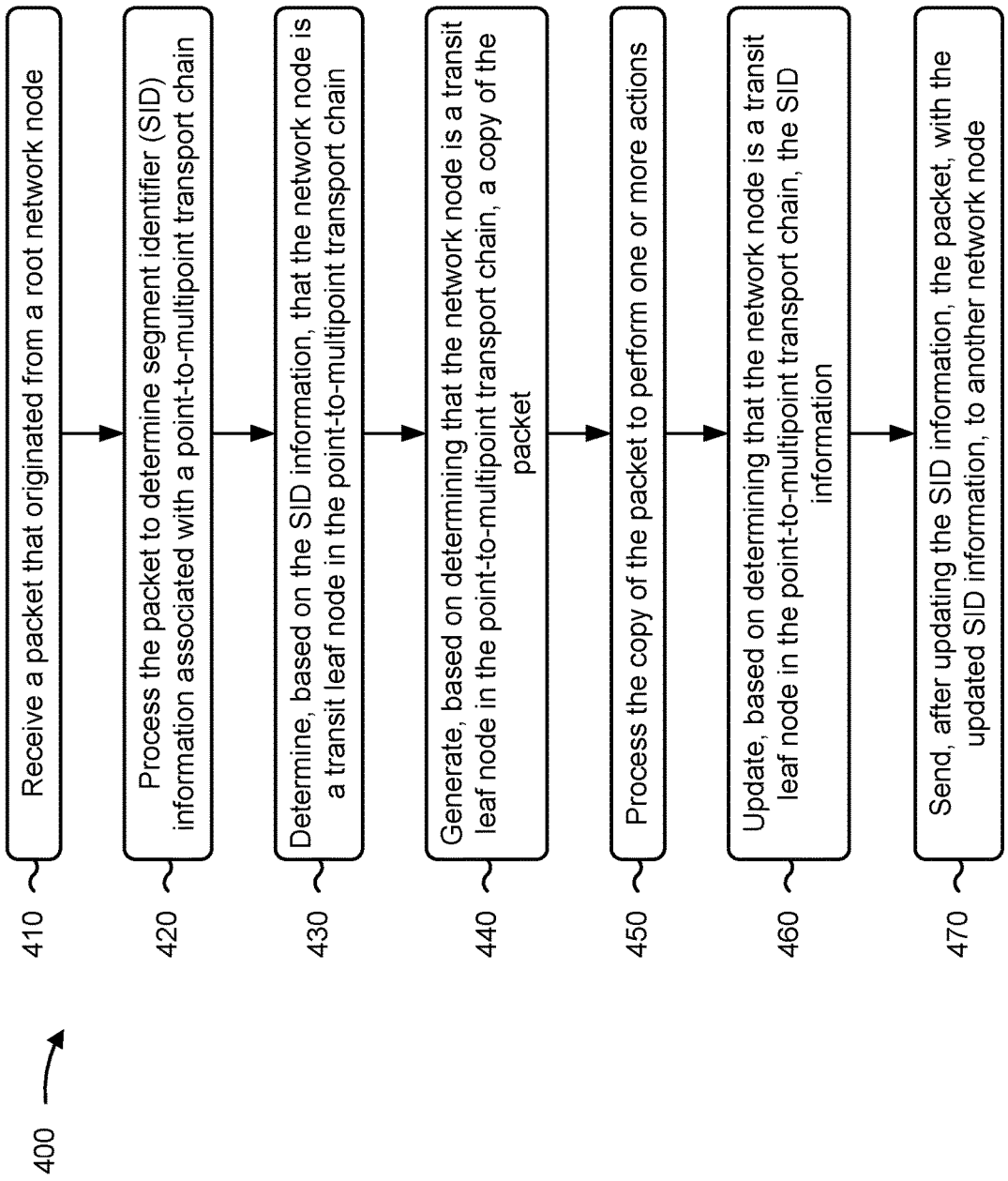

US 11,777,847 B1

POINT-TO-MULTIPOINT TRANSPORT CHAIN

RELATED APPLICATION

This application claims priority to U.S. Provisional Patent Application No. 62/975,374, filed on Feb. 12, 2020, the content of which is incorporated by reference herein in its entirety.

BACKGROUND

Segment routing, a form of computer networking, is a variant of source routing. In a segment routing network, an ingress network node may prepend a header to a packet that contains a list of segments, which are instructions that are executed on subsequent network nodes in the network. These instructions may include forwarding instructions, such as an instruction to forward a packet to a specific destination or interface.

SUMMARY

According to some implementations, a method may include receiving, by a network node, a packet that originated from a root network node; processing, by the network node, the packet to determine segment identifier (SID) information associated with a point-to-multipoint transport chain; determining, by the network node and based on the SID information, that the network node is a transit leaf node in the point-to-multipoint transport chain; generating, by the network node and based on determining that the network node is a transit leaf node in the point-to-multipoint transport chain, a copy of the packet; processing, by the network node, the copy of the packet to perform one or more actions; updating, by the network node and based on determining that the network node is a transit leaf node in the point-to-multipoint transport chain, the SID information; and sending, by the network node and after updating the SID information, the packet, with the updated SID information, to another network node.

According to some implementations, a network node may include one or more memories; and one or more processors to: receive a packet that originated from a root network node; process the packet to determine segment identifier (SID) information associated with a point-to-multipoint transport chain; determine, based on the SID information, that the network node is a tail-end leaf node in the point-to-multipoint transport chain; and process the packet to perform one or more actions.

According to some implementations, a non-transitory computer-readable medium may store one or more instructions. The one or more instructions, when executed by one or more processors of a network node, may cause the one or more processors to: receive a first packet; process the first packet to determine segment identifier (SID) information associated with a first point-to-multipoint transport chain; determine, based on the SID information associated with the first point-to-multipoint transport chain, that the network node is a transit leaf node in the first point-to-multipoint transport chain; generate, based on determining that the network node is a transit leaf node in the first point-to-multipoint transport chain, a copy of the first packet; process the copy of the first packet to perform one or more actions; send, based on determining that the network node is a transit leaf node in the first point-to-multipoint transport chain, the first packet to another network node; receive a second packet; process the second packet to determine SID information associated with a second point-to-multipoint transport chain; determine, based on the SID information associated with the second point-to-multipoint transport chain, that the network node is a tail-end leaf node in the second point-to-multipoint transport chain; and process the second packet to perform one or more additional actions.

BRIEF DESCRIPTION OF THE DRAWINGS

FIGS. 1A-1F are diagrams of one or more example implementations described herein.

FIGS. 4-6 are flowcharts of example processes for utilizing a point-to-multipoint transport chain.

DETAILED DESCRIPTION

Figure 1A:
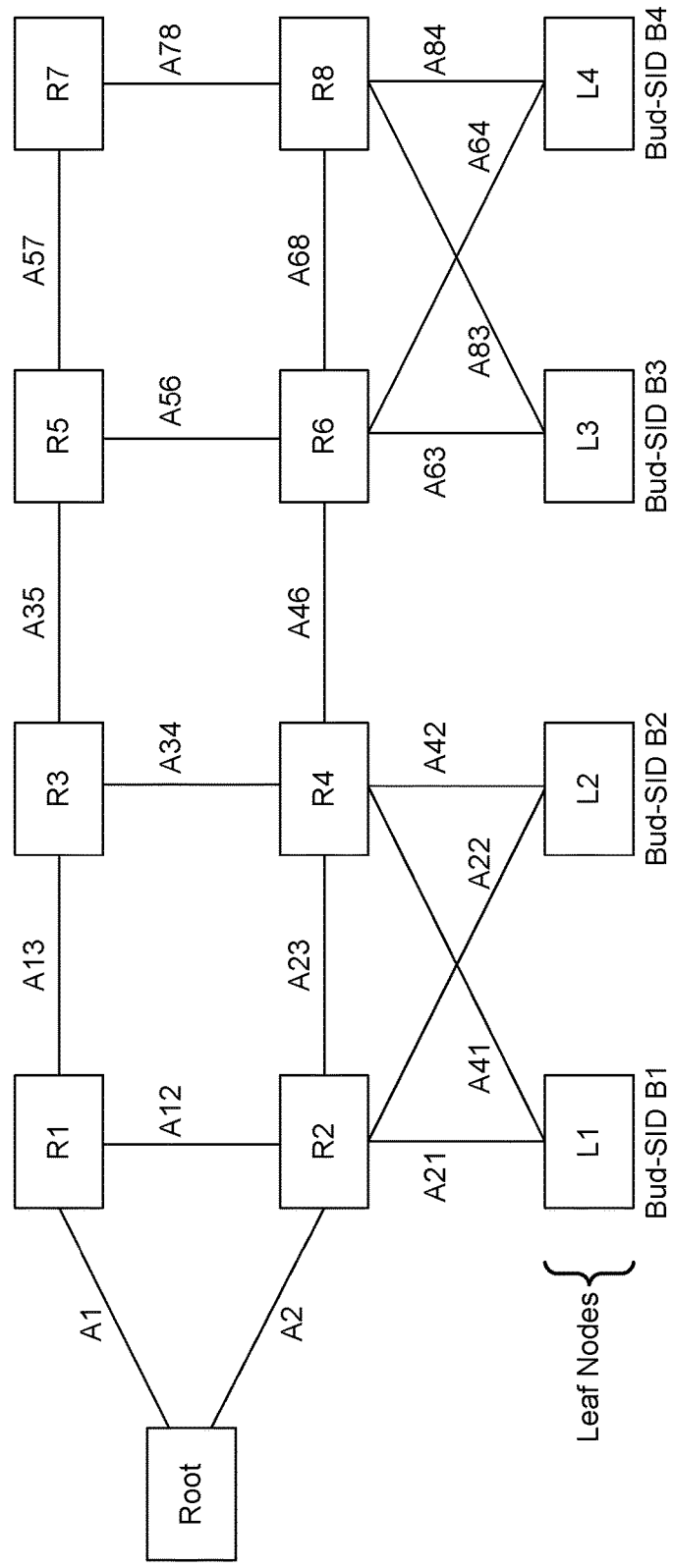

The following detailed description of example implementations refers to the accompanying drawings. The same reference numbers in different drawings may identify the same or similar elements.

Segment routing allows a root network node (e.g., an ingress network node) to determine a routing path (also referred to as a point-to-point segment routing tunnel) to a leaf network node. In some cases, the root network node may prepend, to a packet, a header that contains a list of segments, which may indicate one or more network nodes a packet is to be routed through to the leaf network node.

Point-to-multipoint communication allows a root network node to broadcast a packet to multiple network nodes. In segment routing point-to-multipoint communication, a root network node may construct a plurality of point-to-point segment routing tunnels that respectively connect to a plurality of leaf network nodes. The root network node may send a copy of a packet to each leaf network node via a respective point-to-point segment routing tunnel. However, in some cases, this may cause copies of the packet to be routed multiple times by network nodes that are used as hops for multiple point-to-point segment routing tunnels. This wastes computing resources (e.g., processing resources, memory resources, power resources, and/or the like) of the network nodes to re-route the same packet multiple times and may increase traffic congestion, decrease traffic throughput, increase traffic latency, and/or the like associated with the network nodes.

According to some implementations, a root network node may send a packet to multiple leaf network nodes via a point-to-multipoint transport chain that comprises multiple leaf network nodes. In some implementations, a leaf network node may receive a packet and may determine whether the leaf network node is a transit leaf network node or a tail-end leaf network node based on segment identifier (SID) information included in the packet. In some implementations, when the leaf network node determines that the leaf network node is a transit leaf network node, the leaf network node may create a copy of the packet and process the copy of the packet to perform one or more actions and may route the packet to another network node (e.g., based on the SID information). Additionally, or alternatively, when the leaf network node determines that the leaf network node is a tail-end leaf network node, the leaf network node may process the packet to perform one or more actions.

In this way, the root network node may route a single packet to multiple leaf network nodes via a single point-to-multipoint transport chain. This may reduce an amount of packet copies that need to be sent to the leaf network nodes and therefore reduce usage of computing resources of the network nodes to route the packet copies to the leaf network nodes. Further, this may decrease traffic congestion, increase traffic throughput, decrease traffic latency, and/or the like. Additionally, some implementations described herein do not require state or session information to be maintained by the network nodes when the point-to-multipoint transport chains are created and/or modified, which eliminates a usage of computing resources of the network nodes that would otherwise be needed to maintain more complex point-to-multipoint structures, such as point-to-multipoint trees.

FIGS. 1A-1F are diagrams of one or more example implementations 100 described herein. As shown in FIGS. 1A-1F, example implementation(s) 100 may include a plurality of networking nodes (e.g., segmented routing network nodes) in a network. The plurality of network nodes may comprise hardware, firmware, or a combination of hardware and software and may be, for example, switches, routers, security devices, devices implementing virtual machines, cloud computing resources, and/or the like.

As shown in FIG. 1A, a root network node (e.g., an ingress network node) may be connected to one or more leaf network nodes (e.g., shown as network nodes L1-L4). In some implementations, the root network node may be connected to the one or more leaf network nodes via one or more transit network nodes (e.g., shown as network nodes R1-R8). In some implementations, one or more links may connect a network node to another network node. For example, as shown in FIG. 1A, the root network node may be connected to transit network node R1 via a link associated with an identifier A1 (e.g., where A1 indicates an interface, an address (e.g., an internet protocol (IP) address), and/or the like of the root network node and/or the transit network node R1) and may be connected to transit network node R2 via a link associated with an identifier A2 (e.g., where A2 indicates an interface, an address, and/or the like of the root network node and/or the transit network node R2). As another example, the leaf network node L2 may be connected to transit network node R2 via a link associated with identifier A22 (e.g., where A22 indicates an interface, an address, and/or the like of the leaf network node L2 and/or the transit network node R2) and may be connected to transit network node R4 via a link associated with an identifier A42 (e.g., where A42 indicates an interface, an address, and/or the like of the leaf network node L2 and/or the transit network node R4). As shown in FIG. 1A, one or more additional links may connect transit network nodes to other transit network nodes and/or other leaf network nodes in a similar manner.

In some implementations, each of the one or more leaf network nodes; the one or more transit network nodes; the one or more links that connect the root network node, the one or more leaf network nodes, and/or the one or more transit network nodes; and/or the like may be associated with a segment identifier (SID). For example, each network node may be associated with at least one SID that indicates an interface, an address (e.g., an Internet protocol (IP) address), and/or the like of the network node (e.g., shown as the identifiers A1 through A84 in FIG. 1A). Additionally, or alternatively, each leaf network node may be associated with an SID (e.g., shown as bud-SIDs B1-B4 in FIG. 1A) that indicates a preferred path (e.g., a shortest path, a path with a preferred amount of hops, and/or the like) from a particular network node (e.g., the root network node, another leaf network node, a transit network node, and/or the like) to the leaf network node.

In some implementations, the root network node may be configured to route a packet to a plurality of leaf network nodes using a point-to-multipoint transport chain. A point-to-multipoint transport chain may be a point-to-point segment routing tunnel that includes a tail-end leaf network node (e.g., a destination leaf network node of the point-to-multipoint transport chain), one or more transit leaf network nodes (e.g., one or more leaf network nodes configured to forward the packet through the tunnel and process information included in the packet to perform one or more actions), and/or one or more transit network nodes (e.g., one or more network nodes configured to forward the packet through the tunnel). In this way, the tunnel resembles a chain that reaches multiple leaf network nodes and therefore is called a point-to-multipoint transport chain (e.g., also referred to as a root-to-multiple-leaves transport chain). A point-to-multipoint transport chain may be represented by a list of SIDs, where each SID is associated with a network node that is part of the point-to-multipoint transport chain. Further description regarding example point-to-multipoint transport chains are described herein in relation to FIGS. 1E-1F.

In some implementations, a leaf network node may be configured to be a transit leaf network node for at least one point-to-multipoint transport chain and/or may be configured to be a tail-end leaf network node for at least one other point-to-multipoint transport chain. In some implementations, a leaf network node that is configured to be a transit leaf network node may be referred to as a "bud-node" (e.g., a leaf network node capable of performing routing of a packet and processing actions concerning the packet). For example, a bud-node leaf network node may be configured to receive a packet and forward the packet and may also be configured to make a copy of the packet (e.g., after receiving the packet and before forwarding the packet) and process the copy of the packet to perform one or more actions. In some implementations, a transit leaf network node may comprise one or more bud-node segments (e.g., one or more segments of the leaf network node to route and process a packet of a particular type). For example, a transit leaf network node may be configured to (e.g., may comprise a bud-node segment to) route and process a segment routing multiprotocol label switching (SR-MPLS) packet, may be configured to (e.g., may comprise a bud-node segment to) route and process a segment routing Internet protocol version 6 (SRv6) packet, and/or the like. In this way, a transit leaf network node may be configured to concurrently handle different types of segment routing packets (e.g., when the transit leaf network node is respectively part of different point-to-multipoint transport chains).

Figure 1B:
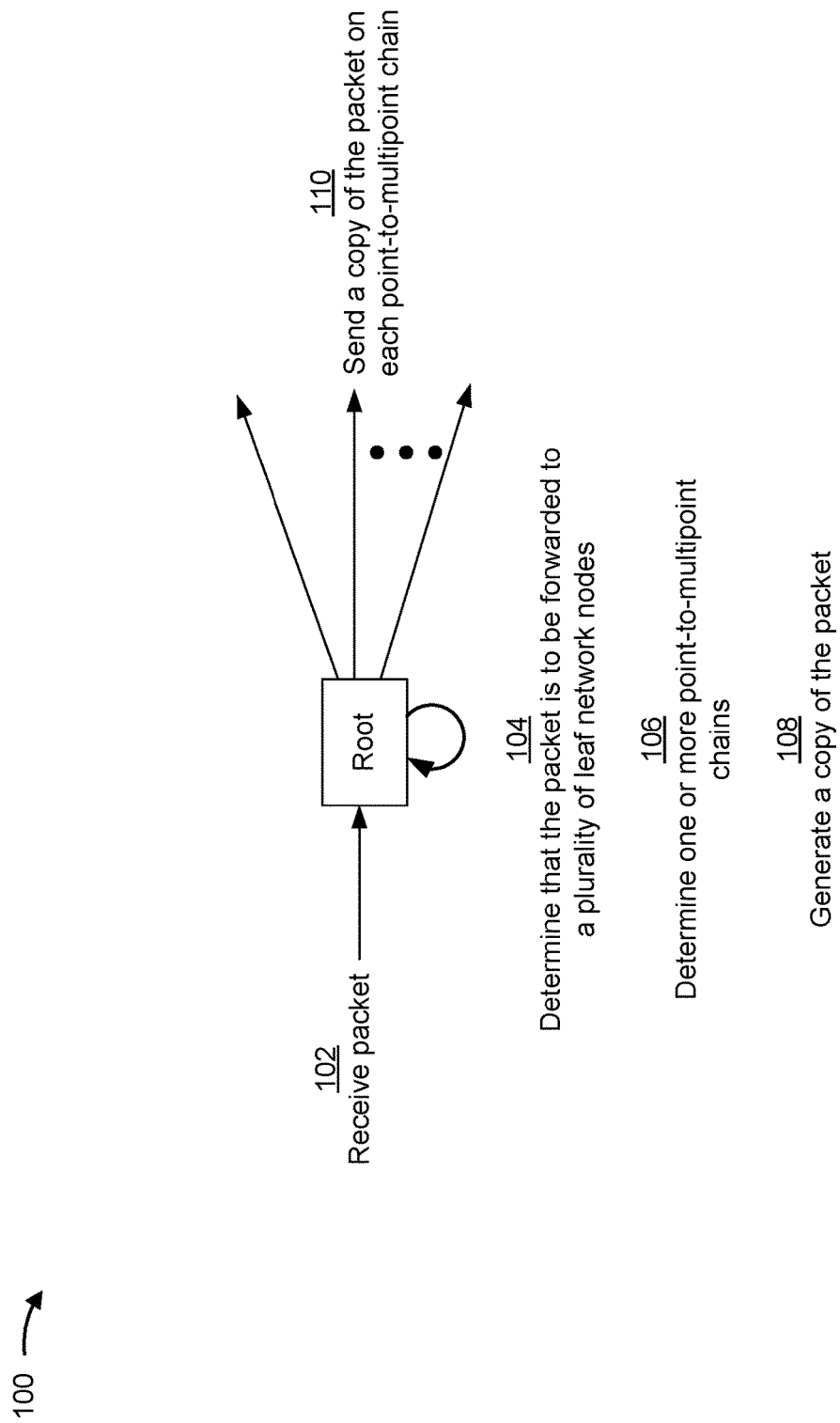

As shown in FIG. 1B and by reference number 102, a root network node may receive a packet (e.g., an ingress packet from an endpoint device that is a source for network traffic). As shown by reference number 104, the root network node may determine that the packet is to be forwarded to a plurality of leaf network nodes (e.g., leaf network nodes L1-L4 as shown in FIG. 1A). As shown by reference number 106, the root network node may determine and/or identify one or more point-to-multipoint transport chains to facilitate routing the packet to the plurality of leaf network nodes. For example, the root network node may obtain information concerning respective SIDs associated with the plurality of leaf network nodes and/or respective SIDs associated with one or more transit network nodes (e.g., via advertisement routes sent by the plurality of leaf network nodes and/or the one or more transit network nodes). The root network node may construct the one or more point-to-multipoint transport chains (e.g., generate one or more list of SIDs indicating respective paths to different sets of the leaf network nodes) to reach each of the plurality of leaf network nodes (e.g., based on criteria, such as maximum hop count for a chain, a maximum length of an SID list, and/or the like). Additionally, or alternatively, the root network node may obtain information identifying the one or more point-to-multipoint transport chains from another device, such as a segment routing configuration server device.

As shown by reference number 108, the root network node may generate a copy of the packet to send on each point-to-multipoint transport chain (e.g., the root network node may make N copies of the packet to transmit via N point-to-multipoint transport chains, where N is greater than or equal to 1). For a copy of the packet, the root network node may prepend a header that includes SID information associated with a respective point-to-multipoint transport chain (e.g., a list of SIDs of the network nodes that comprise the point-to-multipoint transport chain). For example, when the packet is an SR-MPLS packet, the root network node may add one or more labels that are associated with a point-to-multipoint transport chain to a header of the packet (e.g., where each label identifies an SID of a respective network node of the point-to-multipoint transport chain). The root network node may cause an identifier (e.g., a bottom-of-stack identifier) included in a label associated with a tail-end leaf network node of the point-to-multipoint transport chain to indicate that the label is the last label in the header. Additionally, or alternatively, the root network node may include an end-of-chain label in the header to identify where labels associated with the point-to-multipoint transport chain cease in the header. As another example, when the packet is an SRv6 packet, the root network node may add the list of SIDs of the network node that comprise the point-to-multipoint transport chain to a segment routing header of the packet. As shown by reference number 110, the root network node may forward each copy of the packet on a respective point-to-multipoint transport chain of the one or more point-to-multipoint transport chains.

As shown in FIG. 1C and by reference number 112, a packet (e.g., that includes SID information in a header of the packet) may transmit from the root network node to a leaf network node via a point-to-multipoint transport chain (e.g., via one or more links and/or one or more transit network nodes associated with a point-to-multipoint transport chain). As shown by reference number 114, the leaf network node may process the packet to identify and/or determine the SID information associated with the point-to-multipoint transport chain that is included in the packet. For example, when the packet is a SR-MPLS packet and the SID information comprises one or more labels associated with the point-to-multipoint transport chain in a header of the packet, the leaf network node may process (e.g., parse) the packet to determine and/or identify the header of the packet and/or the SID information. As another example, when the packet is a SRv6 packet and the SID information comprises one or more SIDs associated with the point-to-multipoint transport chain in a segment routing header of the packet, the leaf network node may process (e.g., parse) the packet to determine and/or identify the segment routing header of the packet and/or the SID information.

As shown by reference number 116, the leaf network node may determine that the leaf network node is a transit leaf network node. In some implementations, the leaf network node may determine that an active SID of the SID information matches an SID associated with the leaf network node (e.g., the bud-SID of the leaf network node) and may determine that the SID information includes at least one additional SID. Accordingly, the leaf network node may determine (e.g., based on determining that the active SID matches the SID associated with the leaf network node and determining that the SID information includes at least one additional SID) that the network node is a transit leaf node in the point-to-multipoint transport chain.

For example, when the packet is an SR-MPLS packet, the leaf network node may identify an active label, of the one or more labels in the header of the packet, and may determine that the active label identifies an SID that matches an SID associated with the leaf network node (e.g., the bud-SID of the leaf network node). The leaf network node may determine (e.g., after determining that the active label identifies an SID that matches the SID associated with the network node) that the leaf network node is a transit leaf node based on an identifier (e.g., a bottom-of-stack identifier) included in the active label (e.g., when an S-bit of the bottom-of-stack identifier of the active label is set to 0). Additionally, or alternatively, the leaf network node may identify an active label and a next-active label of two or more labels included in the header of the packet and may determine that the active label identifies an SID that matches an SID associated with the leaf network node (e.g., the bud-SID of the leaf network node) and that the next-active label is not an end-of-chain label. Accordingly, the leaf network node may determine (e.g., based on determining that the active label identifies an SID that matches the SID associated with the leaf network node and that the next-active label is not an end-of-chain label) that the leaf network node is a transit leaf network node.

As another example, when the packet is an SRv6 packet, the leaf network node may determine that an active SID of the segment routing header of the packet matches an SID associated with the leaf network node and may determine that the segment routing header of the packet includes at least one additional SID. Accordingly, the leaf network node may determine (e.g., based on determining that the active SID of the segment routing header of the packet matches the SID associated with the leaf network node and determining that the segment routing header of the packet includes at least one additional SID) that the leaf network node is a transit leaf network node.

As shown by reference number 118, the leaf network node may generate a copy of the packet (e.g., based on determining that the leaf network node is a transit leaf network node). As shown by reference number 120, the leaf network node may process the copy of the packet to perform one or more actions. The one or more actions may include causing one or more settings of the leaf network node to be adjusted (e.g., causing a firewall setting, a transmission setting, and/or the like to be adjusted); causing information included in the packet to be saved in a data structure (e.g., causing information include in a payload of the packet to be stored in a data structure of the leaf network node and/or a data structure accessible to the leaf network node); generating an additional packet (e.g., generating a packet that indicates a status of the leaf network node) and sending the additional packet to another network node (e.g., for reporting purposes). In some implementations, the leaf network node may identify SID information (e.g., SID information copied from the SID information of the packet) included in the copy of the packet (e.g., in a header of the copy of the packet) and remove the SID information from the copy of the packet (e.g., because the copy of the packet is not to be forwarded by the leaf network node). The network node may process, after removing the SID information from the copy of the packet, the copy of the packet to perform the one or more actions.

For example, when the packet is an SR-MPLS packet, the leaf network node may identify a header of the copy of the packet that includes one or more labels associated with the point-to-multipoint transport chain and remove the header from the copy of the packet. The leaf network node may process, after removing the header from the copy of the packet, the copy of the packet to perform the one or more actions. Additionally, or alternatively, the leaf network node may remove two or more labels associated with the point-to-multipoint transport chain (e.g., at least one label associated with network nodes of the point-to-multipoint transport chain and an end-of-chain label) from the header of the copy of the packet and may process (e.g., after removing the two or more labels associated with the point-to-multipoint transport chain from the header of the copy of the packet) the copy of the packet to perform the one or more actions In an additional example, when the packet is an SRv6 packet, the leaf network node may identify a segment routing header of the copy of the packet and may remove the segment routing header from the copy of the packet. The leaf network node may process (e.g., after removing the segment routing header from the copy of the packet) the copy of the packet to perform the one or more actions.

As shown by reference number 122, the leaf network node may update the SID information included in the packet (e.g., based on determining that the leaf network node is a transit leaf network node). For example, the leaf network node may remove the active SID from the SID information (e.g., and therefore cause the SID information to indicate a new active SID). As shown by reference number 124, the leaf network node may forward the packet (e.g., with the updated SID information) to another network node in the point-to-multipoint transport chain based on the updated SID information (e.g., to a network node associated with the new active SID).

Figure 1D:
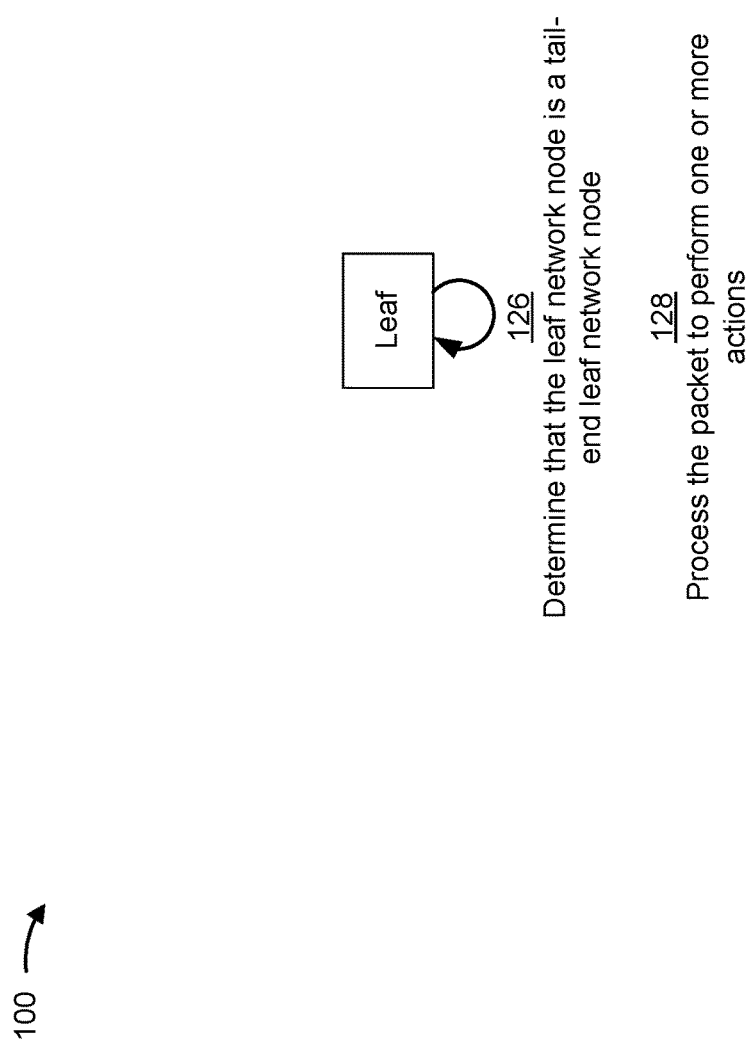

Additionally, or alternatively, as shown in FIG. 1D and by reference number 126, the leaf network node may process the packet (e.g., transmitted from the root network node to the leaf network node via the point-to-multipoint transport chain) to determine that the leaf network node is a tail-end leaf network node in the point-to-multipoint transport chain. In some implementations, the leaf network node may determine that an active SID of the SID information matches an SID associated with the leaf network node (e.g., the bud-SID of the leaf network node) and may determine that the SID information does not include any additional SIDs. Accordingly, the leaf network node may determine (e.g., based on determining that the active SID of the SID information matches the SID associated with the network node and determining that the SID does not include any additional SIDs) that the network node is a tail-end leaf node.

For example, when the packet is an SR-MPLS packet, the leaf network node may determine that an active label, of the one or more labels in the header of the packet, identifies an SID that matches an SID associated with the leaf network node (e.g., the bud-SID of the leaf network node) and may determine that an identifier included in the active label (e.g., a bottom-of-stack identifier) indicates that the active label is a last label in the header of the packet (e.g., when an S-bit of the bottom-of-stack identifier of the active label is set to 1). Accordingly, the leaf network node may determine (e.g., after determining that the active label identifies an SID that matches the SID associated with the network node and determining that the identifier included in the active label indicates that the active label is the last label in the header of the packet) that the network node is a tail-end leaf node. Additionally, or alternatively, the leaf network node may identify an active label and a next-active label of the two or more labels and may determine that the active label identifies an SID that matches an SID associated with the leaf network node (e.g., the bud-SID of the leaf network node) and that the next-active label is an end-of-chain label. Accordingly, the leaf network node may determine (e.g., based on determining that the active label identifies an SID that matches the SID associated with the leaf network node and determining that the next-active label is the end-of-chain label) that the network node is a tail-end leaf node.

As an additional example, when the packet is an SRv6 packet, the leaf network node may determine that an active SID of the segment routing header of the packet matches an SID associated with the leaf network node and may determine that the segment routing header of the packet does not include any additional SIDs. Accordingly, the leaf network node may determine (e.g., based on determining that the active SID of the segment routing header of the packet matches the SID associated with the leaf network node and determining that the segment routing header of the packet does not include any additional SIDs) that the leaf network node is a tail-end leaf node.

As shown by reference number 128, the leaf network node may process the packet to perform one or more actions, such as cause one or more settings of the leaf network node to be adjusted, cause information included in the packet to be saved in a data structure, generate an additional packet and send the additional packet to another network node, and/or the like. In some implementations, the leaf network node may remove the SID information from the packet and process (e.g., after removing the SID information from the packet), the packet to perform the one or more actions. For example, when the packet is an SR-MPLS packet, the leaf network node may remove the header from the packet and may process, after removing the header from the packet, to perform the one or more actions. Additionally, or alternatively, the leaf network node may remove two or more labels associated with the point-to-multipoint transport chain (e.g., at least one label associated with a network node associated with the point-to-multipoint transport chain and an end-of-chain label) from the header of the packet and may process, after removing the two or more labels associated with the point-to-multipoint transport chain from the header of the packet, the packet to perform the one or more actions. In an additional example, when the packet is an SRv6 packet, the leaf network node may remove the segment routing header from the copy of the packet and may process (e.g., after removing the segment routing header from the packet) the packet to perform the one or more actions.

Figure 1E:
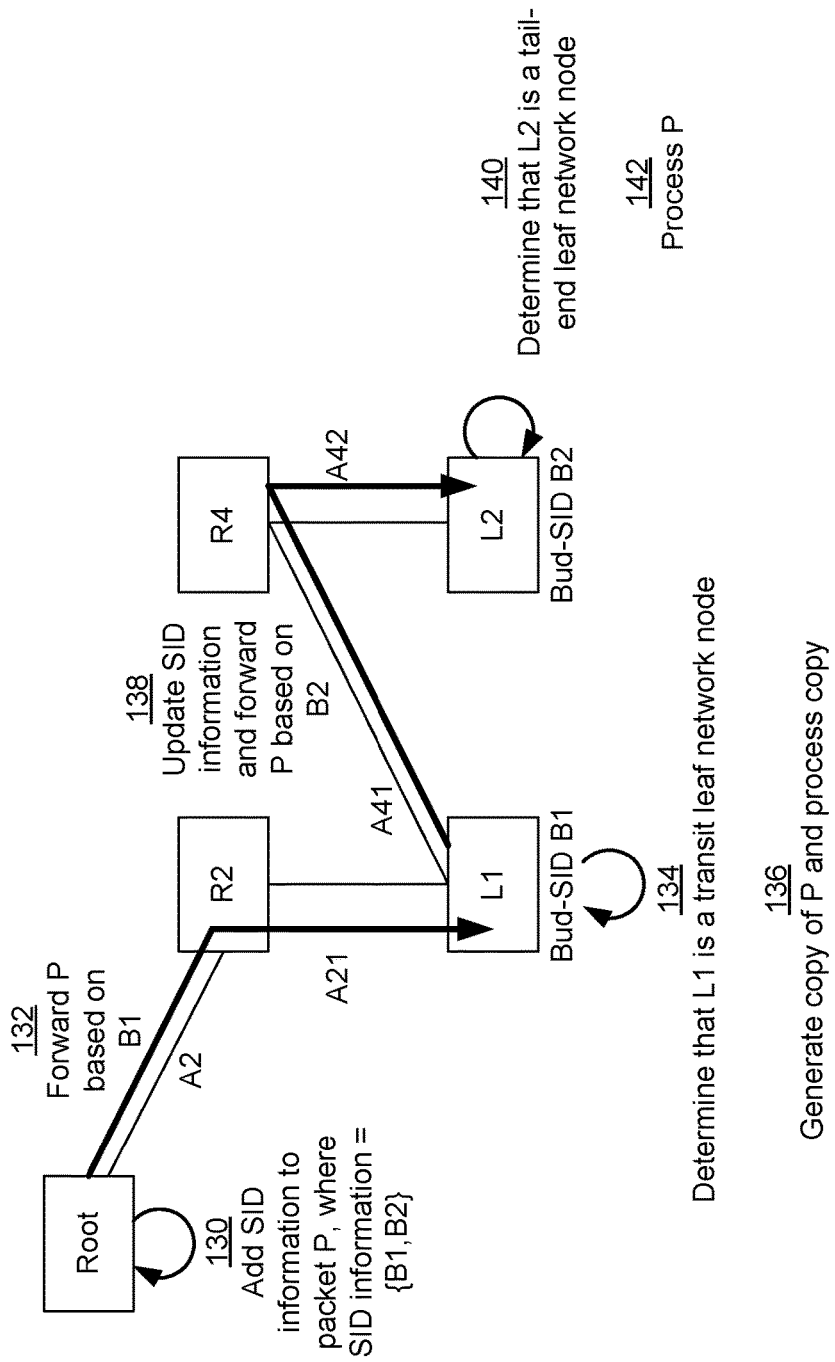

FIG. 1E illustrates an example point-to-multipoint transport chain in relation to the network shown in FIG. 1A. As shown in FIG. 1E, the example point-to-multipoint transport chain may route from a root network node, to a transit network node R2 (e.g., via a link associated with an identifier A2), to a leaf network node L1 (e.g., via a link associated with an identifier A21), to a transit network node R4 (e.g., via a link associated with an identifier A41), and to a leaf network node L2 (e.g., via a link associated with an identifier A42). As shown by reference number 130, the root network node may add SID information to a packet P in a similar manner as described herein in relation to FIG. 1B and reference number 108. The SID information may indicate respective bud-SIDs of the leaf network node L1 (e.g., bud-SID B1) and the leaf network node L2 (e.g., bud-SID B2). As shown by reference number 132, the root network node may forward, based on the bud-SID B1 (e.g., that indicates a preferred path from the root network node to the leaf network node L1 via the transit network node R2), the packet P to the leaf network node L1 via the example point-to-multipoint transport chain. Accordingly, the packet may transmit to the leaf network node L1 from the root network node via the transit network node R2 and the links associated with identifiers A2 and A21.

As shown by reference number 134, the leaf network node L1 may determine that the leaf network node L1 is a transit leaf network node in a similar manner as described herein in relation to FIG. 1C and reference number 116. As shown by reference number 136, the leaf network node L1 may generate a copy of the packet P and may process the copy of the packet P to perform one or more actions in a similar manner as described herein in relation to FIG. 1C and reference numbers 118 and 120. As shown by reference number 138, the leaf network node L1 may update the SID information (e.g., remove the bud-SID B1 from the SID information) and may forward, based on the bud-SID B2 (e.g., that indicates a preferred path from the leaf network node L1 to the leaf network node L2 via the transit network node R4), the packet P to the leaf network node L2 via the example point-to-multipoint transport chain in a similar manner as described herein in relation to FIG. 1C and reference numbers 122 and 124. Accordingly, the packet may transmit to the leaf network node L2 from the leaf network node L1 via the transit network node R4 and the links associated with identifier A41 and A42.

As shown by reference number 140, the leaf network node L2 may determine that the leaf network node L2 is a tail-end leaf network node in a similar manner as described herein in relation to FIG. 1D and reference number 126. As shown by reference number 142, the leaf network node L2 may process the packet P to perform one or more actions in a similar manner as described herein in relation to FIG. 1D and reference number 128.

Figure 1F:
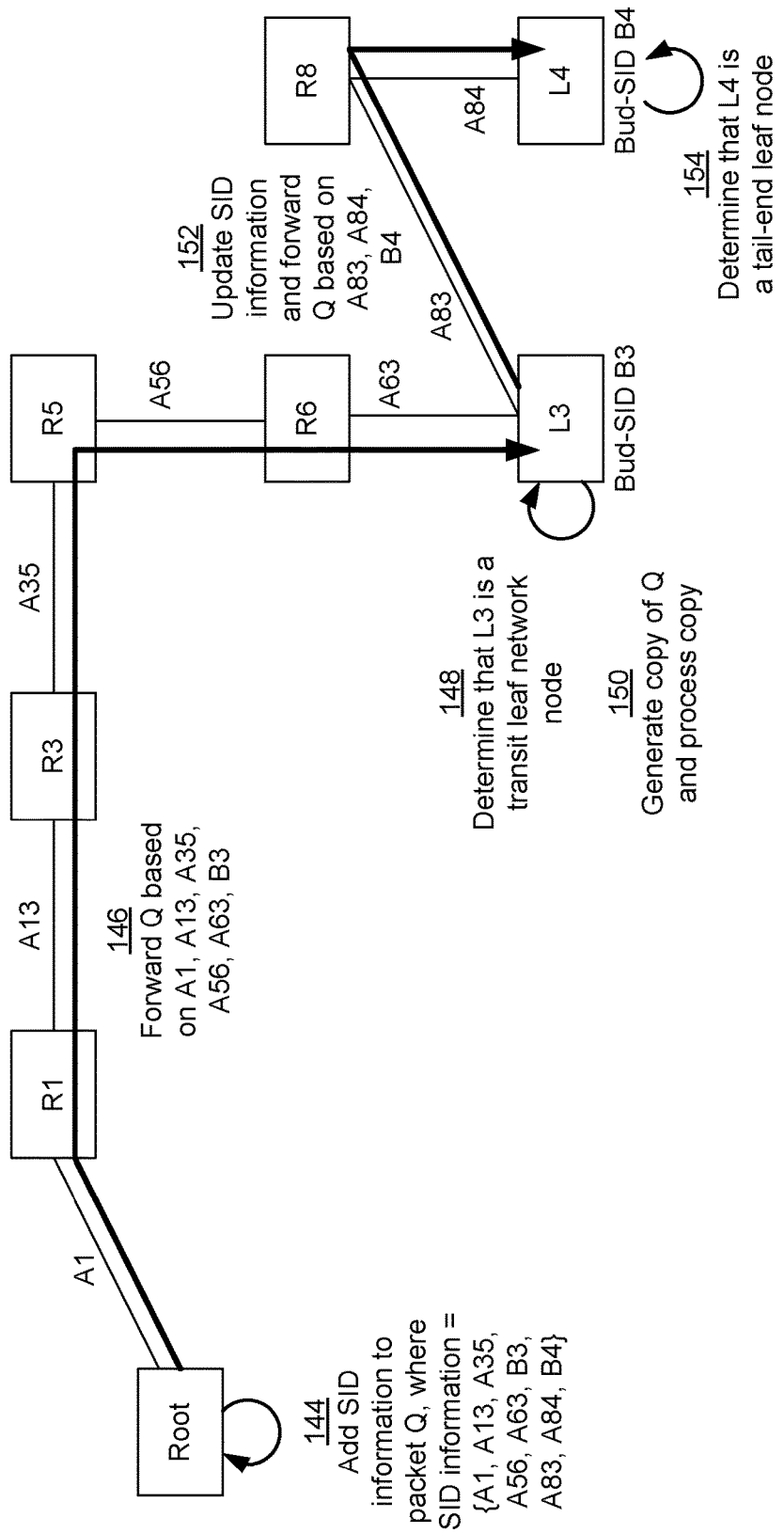

FIG. 1F illustrates an additional example point-to-multipoint transport chain in relation to the network shown in FIG. 1A. As shown in FIG. 1F, the example point-to-multipoint transport chain may route from a root network node, to a transit network node R1 (e.g., via a link associated with an identifier A1), to a transit network node R3 (e.g., via a link associated with an identifier A13), to a transit network node R5 (e.g., via a link associated with an identifier A35), to a transit network node R6 (e.g., via a link associated with an identifier A56), to a leaf network node L3 (e.g., via a link associated with an identifier A63), to a transit network node R8 (e.g., via a link associated with an identifier A83), and to a leaf network node L4 (e.g., via a link associated with an identifier A84). As shown by reference number 144, the root network node may add SID information to a packet Q in a similar manner as described herein in relation to FIG. 1B and reference number 108. The SID information may indicate the respective identifiers associated with the network nodes and/or the links that connect the network nodes (e.g., identifiers A1, A13, A35, A56, A63, B3, A83, A84, B4). The SID information may include the respective bud-SIDs of the leaf network node L3 (e.g., bud-SID B3) and the leaf network node L4 (e.g., bud-SID B4) to indicate that leaf network node L3 and leaf network node L4 are to respectively determine whether leaf network node L3 and leaf network node L4 are transit leaf network nodes or tail-end network nodes when receiving the packet Q.

As shown by reference number 146, the root network node may forward, based on a first portion of the SID information (e.g., that indicates a path from the root network node to the leaf network node L3 via the transit network nodes R1, R3, R5, and R6), the packet Q to the leaf network node L3 via the additional example point-to-multipoint transport chain. Accordingly, the packet may transmit to the leaf network node L3 from the root network node via the transit network nodes R1, R3, R5, and R6; the links associated with identifiers A1, A13, A35, A56, and A63; and bud-SID B3.

As shown by reference number 148, the leaf network node L3 may determine that the leaf network node L3 is a transit leaf network node in a similar manner as described herein in relation to FIG. 1C and reference number 116. As shown by reference number 150, the leaf network node L3 may generate a copy of the packet Q and may process the copy of the packet Q to perform one or more actions in a similar manner as described herein in relation to FIG. 1C and reference numbers 118 and 120.

As shown by reference number 152, the leaf network node L3 may update the SID information (e.g., remove the bud-SID B3 from the SID information) and may forward, based on a second portion of the SID information (e.g., that indicates a path from the leaf network node L3 to the leaf network node L4 via the transit network node R8), the packet Q to the leaf network node L4 via the additional example point-to-multipoint transport chain in a similar manner as described herein in relation to FIG. 1C and reference numbers 122 and 124. Accordingly, the packet may transmit to the leaf network node L4 from the leaf network node L3 via the transit network node R8; the links associated with identifiers A83 and A84; and bud-SID B4.

As shown by reference number 154, the leaf network node L4 may determine that the leaf network node L4 is a tail-end leaf network node in a similar manner as described herein in relation to FIG. 1D and reference number 126. As shown by reference number 156, the leaf network node L4 may process the copy the packet Q to perform one or more actions in a similar manner as described herein in relation to FIG. 1D and reference number 128.

As indicated above, FIGS. 1A-1F are provided merely as one or more examples. Other examples may differ from what is described with regard to FIGS. 1A-1F.

Figure 2:
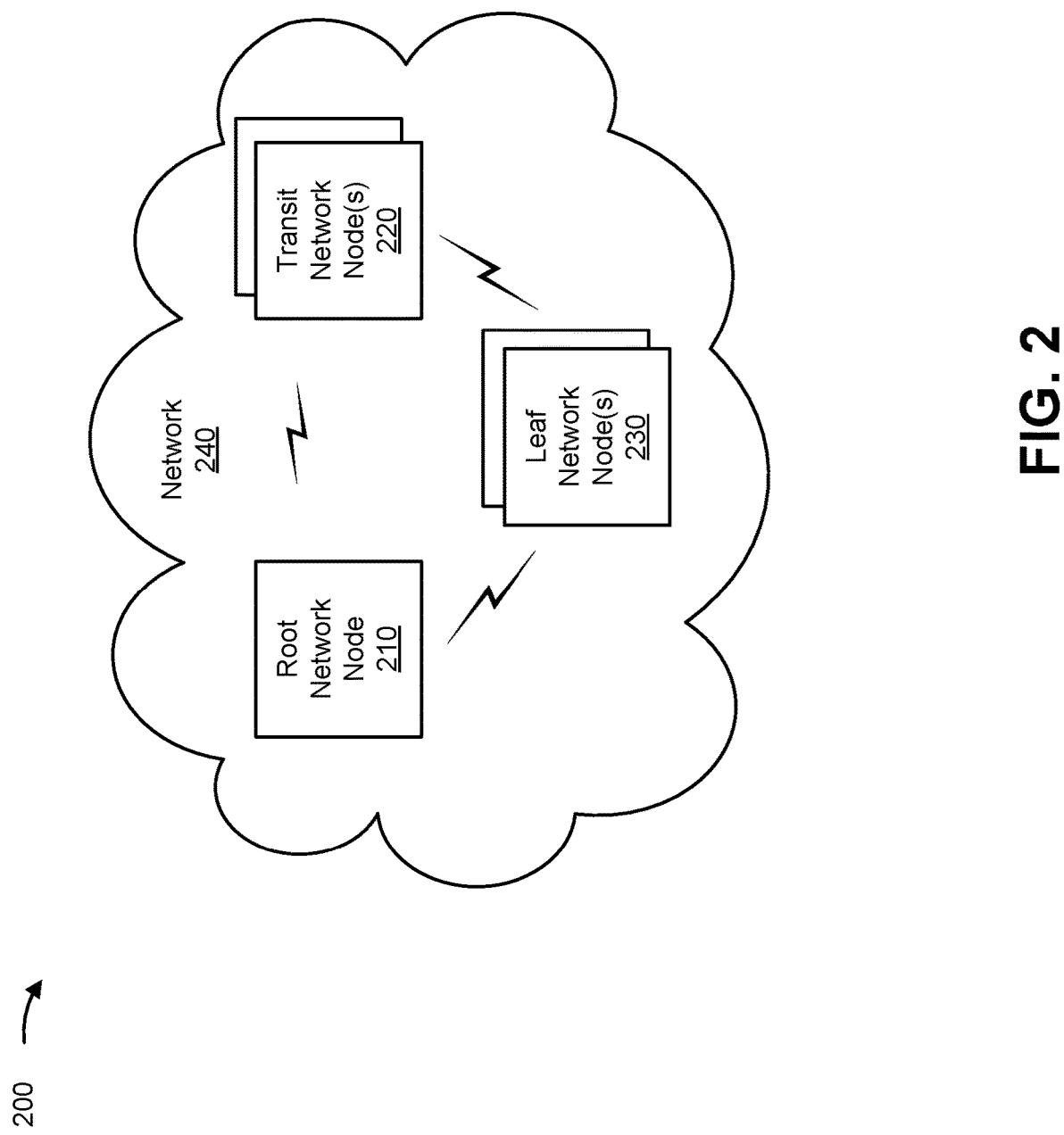
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a root network node 210, one or more transit network nodes 220 (hereinafter referred to collectively as "transit network nodes 220," and individually as "transit network node 220"), one or more leaf network nodes 230 (hereinafter referred to collectively as "leaf network nodes 230," and individually as "leaf network node 230"), and a network 240. Devices of environment 200 may interconnect via wired connections, wireless connections, or a combination of wired and wireless connections.

Root network node 210 includes one or more devices capable of receiving, providing, storing, generating, and/or processing information. In some implementations, root network node 210 may include a router, a switch, a gateway, a firewall device, a modem, a hub, a bridge, a policer, a network interface controller (MC), a reverse proxy, a server (e.g., a proxy server), a multiplexer, a security device, an intrusion detection device, a load balancer, or a similar device. In some implementations, root network node 210 may be implemented as a physical device implemented within a housing, such as a chassis. In some implementations, root network node 210 may be implemented as a virtual device implemented by one or more computer devices of a cloud computing environment or a data center. In some implementations, root network node 210 may correspond to a transmitting network node and/or a receiving network node. In some implementations, root network node 210 may receive, transmit, and/or process (e.g., prepend a header to) a packet.

Transit network node 220 includes one or more devices capable of receiving, providing, storing, generating, and/or processing information. In some implementations, transit network node 220 may include a router, a switch, a gateway, a firewall device, a modem, a hub, a bridge, a policer, a network interface controller (MC), a reverse proxy, a server (e.g., a proxy server), a multiplexer, a security device, an intrusion detection device, a load balancer, or a similar device. In some implementations, transit network node 220 may be implemented as a physical device implemented within a housing, such as a chassis. In some implementations, transit network node 220 may be implemented as a virtual device implemented by one or more computer devices of a cloud computing environment or a data center. In some implementations, transit network node 220 may correspond to a transmitting network node and/or a receiving network node. In some implementations, transit network node 220 may receive and/or transmit a packet.

Leaf network node 230 includes one or more devices capable of receiving, providing, storing, generating, and/or processing information. In some implementations, leaf network node 230 may include a router, a switch, a gateway, a firewall device, a modem, a hub, a bridge, a policer, a network interface controller (MC), a reverse proxy, a server (e.g., a proxy server), a multiplexer, a security device, an intrusion detection device, a load balancer, or a similar device. In some implementations, leaf network node 230 may be implemented as a physical device implemented within a housing, such as a chassis. In some implementations, leaf network node 230 may be implemented as a virtual device implemented by one or more computer devices of a cloud computing environment or a data center. In some implementations, leaf network node 230 may correspond to a transmitting network node and/or a receiving network node. In some implementations, leaf network node 230 may receive, transmit, and/or process (e.g., make a copy of) a packet.

Network 240 includes one or more wired and/or wireless networks. For example, network may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
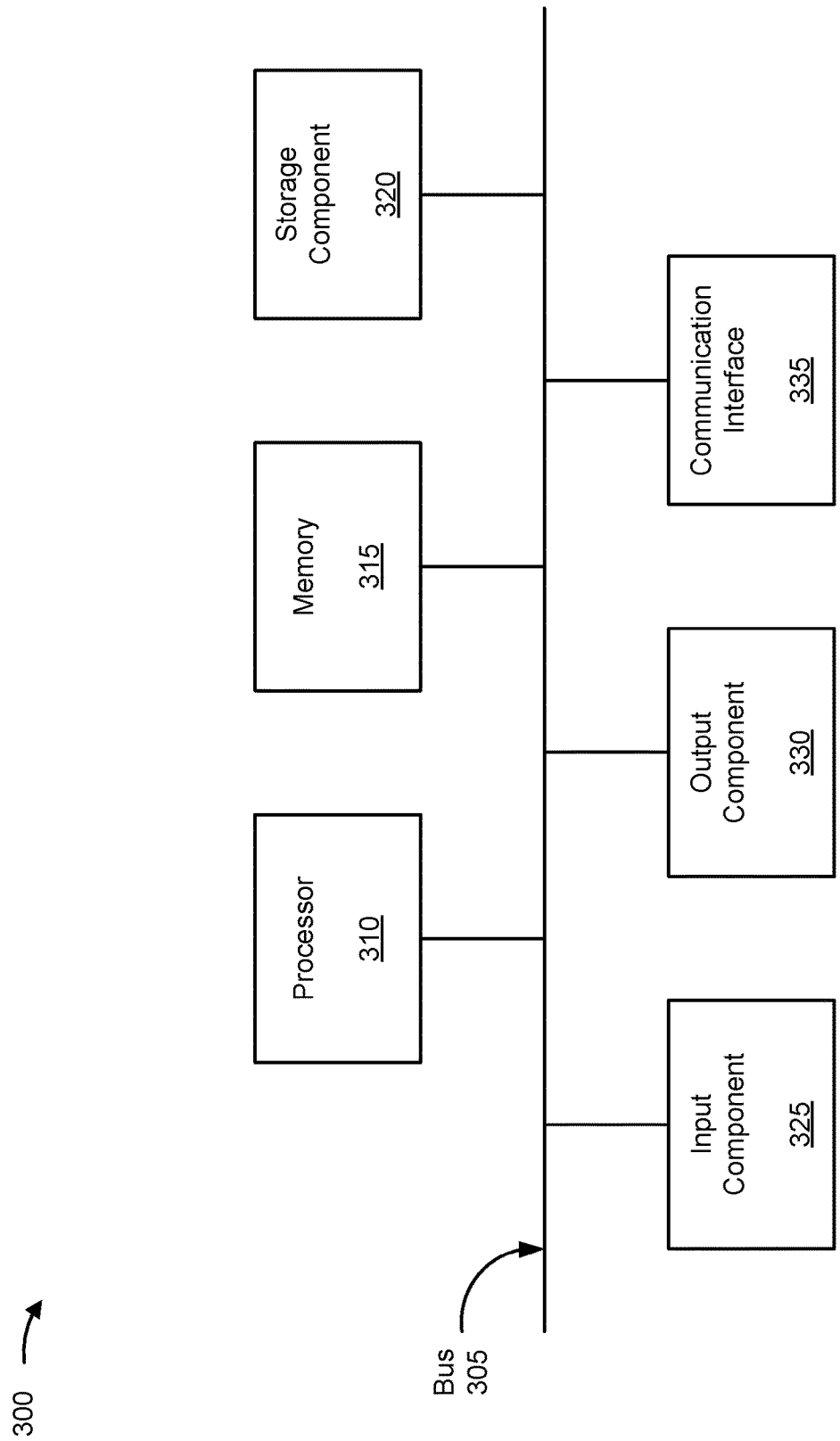
FIGS. 3A and 3B are diagrams of example components of one or more devices of FIG. 2.
Figure 3B:
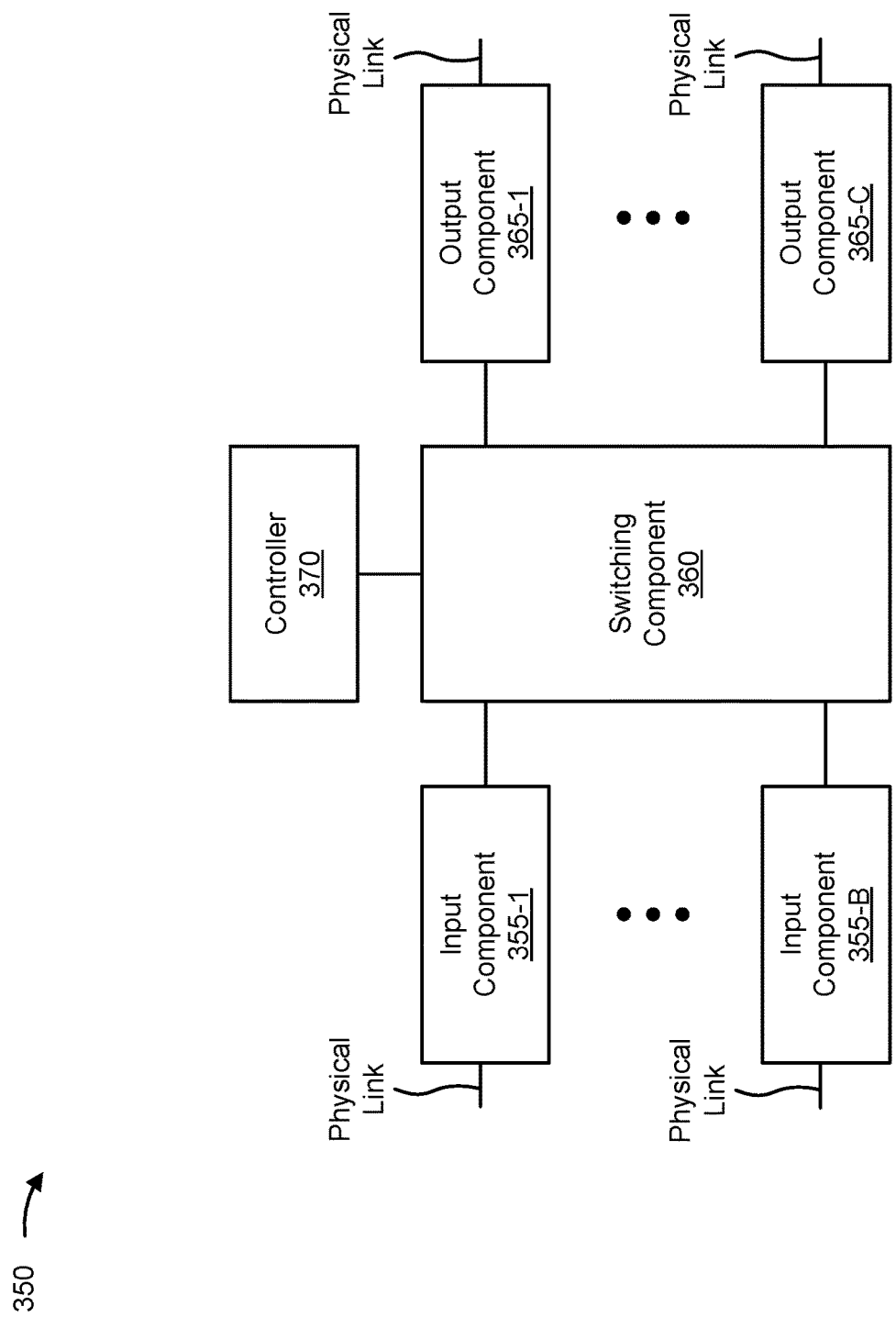

FIGS. 3A-3B are diagrams of example components of one or more devices of FIG. 2. FIG. 3A is a diagram of example components of a device 300. Device 300 may correspond to one or more of root network node 210, transit network node 220, leaf network node 230, and/or the like. In some implementations, one or more of root network node 210, transit network node 220, leaf network node 230, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to one or more of root network node 210, transit network node 220, leaf network node 230, and/or the like. In some implementations, one or more of root network node 210, transit network node 220, leaf network node 230, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical tunnels and may be points of entry for incoming traffic, such as packets. Input component 355 may process incoming traffic, such as by performing data tunnel layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical tunnels. Output component 365 may support data tunnel layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

FIG. 4 is a flow chart of an example process 400 for utilizing a point-to-multipoint transport chain. In some implementations, one or more process blocks of FIG. 4 may be performed by a network node (e.g., leaf network node 230). In some implementations, one or more process blocks of FIG. 4 may be performed by another device or a group of devices separate from or including the network node, such as another network node (e.g., root network node 210 and/or transit network node 220).

As shown in FIG. 4, process 400 may include receiving a packet that originated from a root network node (block 410). For example, the network node (e.g., using processor 310, memory 315, storage component 320, input component 325, output component 330, communication interface 335, input component 355, switching component 360, output component 365, controller 370, and/or the like) may receive a packet that originated from a root network node, as described above.

As further shown in FIG. 4, process 400 may include processing the packet to determine segment identifier (SID) information associated with a point-to-multipoint transport chain (block 420). For example, the network node (e.g., using processor 310, memory 315, storage component 320, input component 325, output component 330, communication interface 335, input component 355, switching component 360, output component 365, controller 370, and/or the like) may process the packet to determine segment identifier (SID) information associated with a point-to-multipoint transport chain, as described above.

As further shown in FIG. 4, process 400 may include determining, based on the SID information, that the network node is a transit leaf node in the point-to-multipoint transport chain (block 430). For example, the network node (e.g., using processor 310, memory 315, storage component 320, input component 325, output component 330, communication interface 335, input component 355, switching component 360, output component 365, controller 370, and/or the like) may determine, based on the SID information, that the network node is a transit leaf node in the point-to-multipoint transport chain, as described above.

As further shown in FIG. 4, process 400 may include generating, based on determining that the network node is a transit leaf node in the point-to-multipoint transport chain, a copy of the packet (block 440). For example, the network node (e.g., using processor 310, memory 315, storage component 320, input component 325, output component 330, communication interface 335, input component 355, switching component 360, output component 365, controller 370, and/or the like) may generate, based on determining that the network node is a transit leaf node in the point-to-multipoint transport chain, a copy of the packet, as described above.

As further shown in FIG. 4, process 400 may include processing the copy of the packet to perform one or more actions (block 450). For example, the network node (e.g., using processor 310, memory 315, storage component 320, input component 325, output component 330, communication interface 335, input component 355, switching component 360, output component 365, controller 370, and/or the like) may process the copy of the packet to perform one or more actions, as described above.

As further shown in FIG. 4, process 400 may include updating, based on determining that the network node is a transit leaf node in the point-to-multipoint transport chain, the SID information (block 460). For example, the network node (e.g., using processor 310, memory 315, storage component 320, input component 325, output component 330, communication interface 335, input component 355, switching component 360, output component 365, controller 370, and/or the like) may update, based on determining that the network node is a transit leaf node in the point-to-multipoint transport chain, the SID information, as described above.

As further shown in FIG. 4, process 400 may include sending, after updating the SID information, the packet, with the updated SID information, to another network node (block 470). For example, the network node (e.g., using processor 310, memory 315, storage component 320, input component 325, output component 330, communication interface 335, input component 355, switching component 360, output component 365, controller 370, and/or the like) may send, after updating the SID information, the packet, with the updated SID information, to another network node, as described above.

Process 400 may include additional implementations, such as any single implementation or any combination of implementations described below and/or in connection with one or more other processes described elsewhere herein.

In a first implementation, determining that the network node is a transit leaf node in the point-to-multipoint transport chain comprises determining that an active SID of the SID information matches an SID associated with the network node; determining, based on determining that the active SID of the SID information matches the SID associated with the network node, that the SID information includes at least one additional SID; and determining, based on determining that the SID information includes at least one additional SID, that the network node is a transit leaf node.

In a second implementation, alone or in combination with the first implementation, processing the copy of the packet to perform the one or more actions comprises identifying copied SID information included in the copy of the packet; removing the copied SID information from the copy of the packet; and processing, after removing the copied SID information from the copy of the packet, the copy of the packet to perform the one or more actions.

In a third implementation, alone or in combination with one or more of the first and second implementations, updating the SID information comprises identifying an active SID of the SID information and removing the active SID from the SID information.

In a fourth implementation, alone or in combination with one or more of the first through third implementations, the packet is a segment routing multiprotocol label switching (SR-MPLS) packet and the SID information comprises one or more labels associated with the point-to-multipoint transport chain that are included in a header of the packet, and determining that the network node is a transit leaf node comprises identifying an active label, of the one or more labels; determining that the active label identifies an SID that matches an SID associated with the network node; and determining, after determining that the active label identifies an SID that matches the SID associated with the network node, that the network node is a transit leaf node based on a bottom-of-stack identifier included in the active label.

In a fifth implementation, alone or in combination with one or more of the first through fourth implementations, the copy of the packet is a segment routing multiprotocol label switching (SR-MPLS) packet, and processing the copy of the packet to perform the one or more actions comprises identifying a header of the copy of the packet that includes one or more labels associated with the point-to-multipoint transport chain; removing the header from the copy of the packet; and processing, after removing the header from the copy of the packet, the copy of the packet to perform the one or more actions.

In a sixth implementation, alone or in combination with one or more of the first through fifth implementations, the packet is a segment routing multiprotocol label switching (SR-MPLS) packet and the SID information comprises two or more labels associated with the point-to-multipoint transport chain that are included in a header of the packet, determining that the network node is a transit leaf node comprises identifying an active label and a next-active label of the two or more labels; determining that the active label identifies an SID that matches an SID associated with the network node; determining that the next-active label is not an end-of-chain label; and determining, based on determining that the active label identifies an SID that matches the SID associated with the network node and determining that the next-active label is not an end-of-chain label, that the network node is a transit leaf node.

In a seventh implementation, alone or in combination with one or more of the first through sixth implementations, the copy of the packet is a segment routing multiprotocol label switching (SR-MPLS) packet, and processing the copy of the packet to perform the one or more actions comprises identifying a header of the copy of the packet that includes two or more labels associated with the point-to-multipoint transport chain and at least one additional label; removing the two or more labels associated with the point-to-multipoint transport chain from the header of the copy of the packet; and processing, after removing the two or more labels associated with the point-to-multipoint transport chain from the header of the copy of the packet, the copy of the packet to perform the one or more actions.

In an eighth implementation, alone or in combination with one or more of the first through seventh implementations, the packet is a segment routing Internet protocol version 6 (SRv6) packet and the SID information comprises one or more SIDs associated with the point-to-multipoint transport chain that are included in a segment routing header of the packet, and determining that the network node is a transit leaf node comprises: determining that an active SID of the segment routing header of the packet matches an SID associated with the network node; determining that the segment routing header of the packet includes at least one additional SID; and determining, based on determining that the active SID of the segment routing header of the packet matches the SID associated with the network node and determining that the segment routing header of the packet includes at least one additional SID, that the network node is a transit leaf node.

In a ninth implementation, alone or in combination with one or more of the first through eighth implementations, the copy of the packet is a segment routing Internet protocol version 6 (SRv6) packet, and processing the copy of the packet to perform the one or more actions comprises identifying a segment routing header of the copy of the packet; removing the segment routing header from the copy of the packet, and processing, after removing the segment routing header from the copy of the packet, the copy of the packet to perform the one or more actions.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
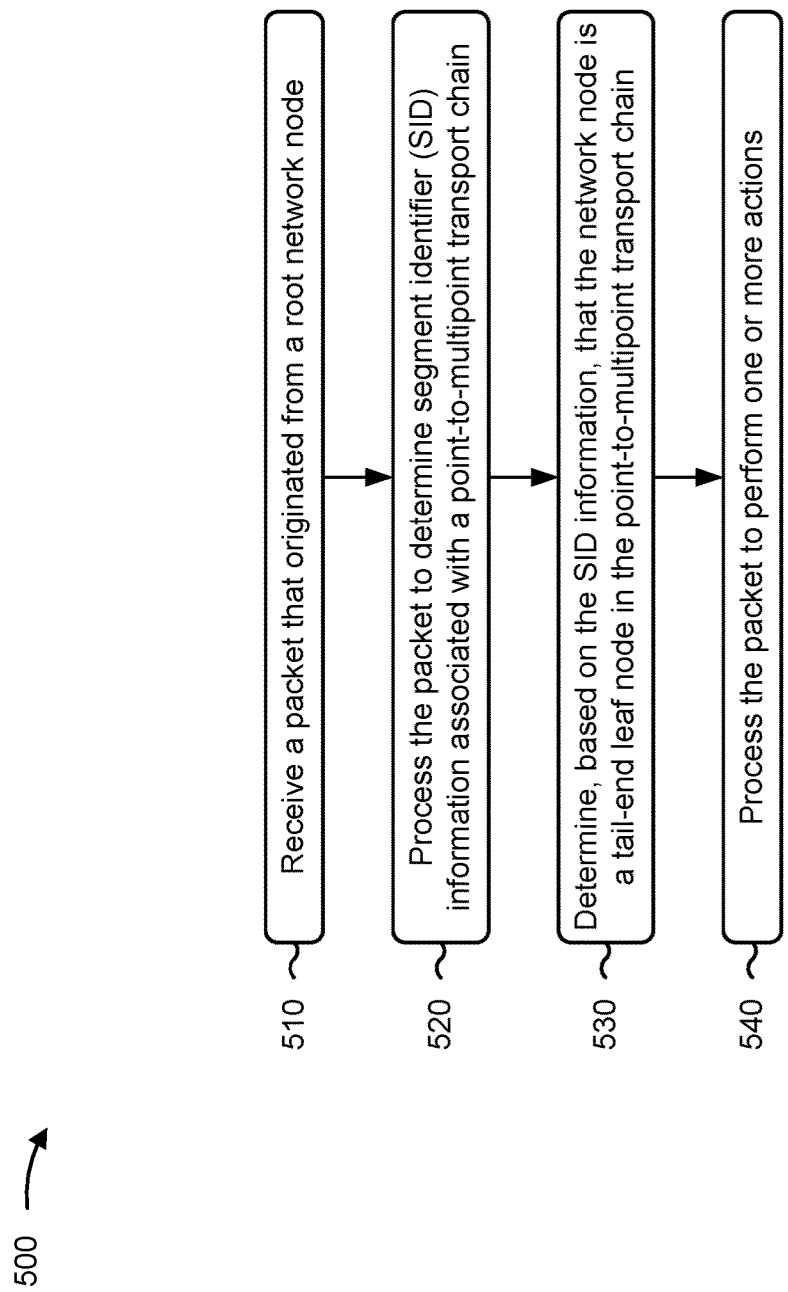

FIG. 5 is a flow chart of an example process 500 for utilizing a point-to-multipoint transport chain. In some implementations, one or more process blocks of FIG. 5 may be performed by a network node (e.g., leaf network node 230). In some implementations, one or more process blocks of FIG. 5 may be performed by another device or a group of devices separate from or including the network node, such as another network node (e.g., root network node 210 and/or transit network node 220).

As shown in FIG. 5, process 500 may include receiving a packet that originated from a root network node (block 510). For example, the network node (e.g., using processor 310, memory 315, storage component 320, input component 325, output component 330, communication interface 335, input component 355, switching component 360, output component 365, controller 370, and/or the like) may receive a packet that originated from a root network node, as described above.

As further shown in FIG. 5, process 500 may include processing the packet to determine segment identifier (SID) information associated with a point-to-multipoint transport chain (block 520). For example, the network node (e.g., using processor 310, memory 315, storage component 320, input component 325, output component 330, communication interface 335, input component 355, switching component 360, output component 365, controller 370, and/or the like) may process the packet to determine segment identifier (SID) information associated with a point-to-multipoint transport chain, as described above.

As further shown in FIG. 5, process 500 may include determining, based on the SID information, that the network node is a tail-end leaf node in the point-to-multipoint transport chain (block 530). For example, the network node (e.g., using processor 310, memory 315, storage component 320, input component 325, output component 330, communication interface 335, input component 355, switching component 360, output component 365, controller 370, and/or the like) may determine, based on the SID information, that the network node is a tail-end leaf node in the point-to-multipoint transport chain, as described above.

As further shown in FIG. 5, process 500 may include processing the packet to perform one or more actions (block 540). For example, the network node (e.g., using processor 310, memory 315, storage component 320, input component 325, output component 330, communication interface 335, input component 355, switching component 360, output component 365, controller 370, and/or the like) may process the packet to perform one or more actions, as described above.

Process 500 may include additional implementations, such as any single implementation or any combination of implementations described below and/or in connection with one or more other processes described elsewhere herein.

In a first implementation, determining that the network node is a tail-end leaf node in the point-to-multipoint transport chain comprises determining that an active SID of the SID information matches an SID associated with the network node; determining, based on determining that the active SID of the SID information matches the SID associated with the network node, that the SID information does not include any additional SIDs; and determining, based on determining that the SID does not include any additional SIDs, that the network node is a tail-end leaf node.

In a second implementation, alone or in combination with the first implementation, processing the packet to perform the one or more actions comprises removing the SID information from the packet and processing, after removing the SID information from the packet, the packet to perform the one or more actions.

In a third implementation, alone or in combination with one or more of the first and second implementations, the one or more actions comprise at least one of causing one or more settings of the network node to be adjusted; causing information included in the packet to be saved in a data structure; or generating an additional packet and sending the additional packet to another network node.

In a fourth implementation, alone or in combination with one or more of the first through third implementations, the packet is a segment routing multiprotocol label switching (SR-MPLS) packet and the SID information comprises one or more labels associated with the point-to-multipoint transport chain that are included in a header of the packet, and determining that the network node is a tail-end leaf node in the point-to-multipoint transport chain comprises determining that an active label, of the one or more labels, identifies an SID that matches an SID associated with the network node; determining that an identifier included in the active label indicates that the active label is a last label in the header of the packet; and determining, after determining that the active label identifies an SID that matches the SID associated with the network node and determining that the identifier included in the active label indicates that the active label is the last label in the header of the packet, that the network node is a tail-end leaf node.

In a fifth implementation, alone or in combination with one or more of the first through fourth implementations, the packet is a segment routing multiprotocol label switching (SR-MPLS) packet and the SID information comprises two or more labels associated with the point-to-multipoint transport chain that are included in a header of the packet, and determining that the network node is a tail-end leaf node comprises identifying an active label and a next-active label of the one or more labels; determining that the active label identifies an SID that matches an SID associated with the network node; determining that the next-active label is an end-of-chain label; and determining, based on determining that the active label identifies an SID that matches the SID associated with the network node and determining that the next-active label is the end-of-chain label, that the network node is a tail-end leaf node.

In a sixth implementation, alone or in combination with one or more of the first through fifth implementations, the packet is a segment routing Internet protocol version 6 (SRv6) packet and the SID information comprises one or more SIDs associated with the point-to-multipoint transport chain that are included in a segment routing header of the packet, and determining that the network node is a tail-end leaf node comprises determining that an active SID of the segment routing header of the packet matches an SID associated with the network node; determining that the segment routing header of the packet does not include any additional SIDs; and determining, based on determining that the active SID of the segment routing header of the packet matches the SID associated with the network node and determining that the segment routing header of the packet does not include any additional SIDs, that the network node is a tail-end leaf node.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
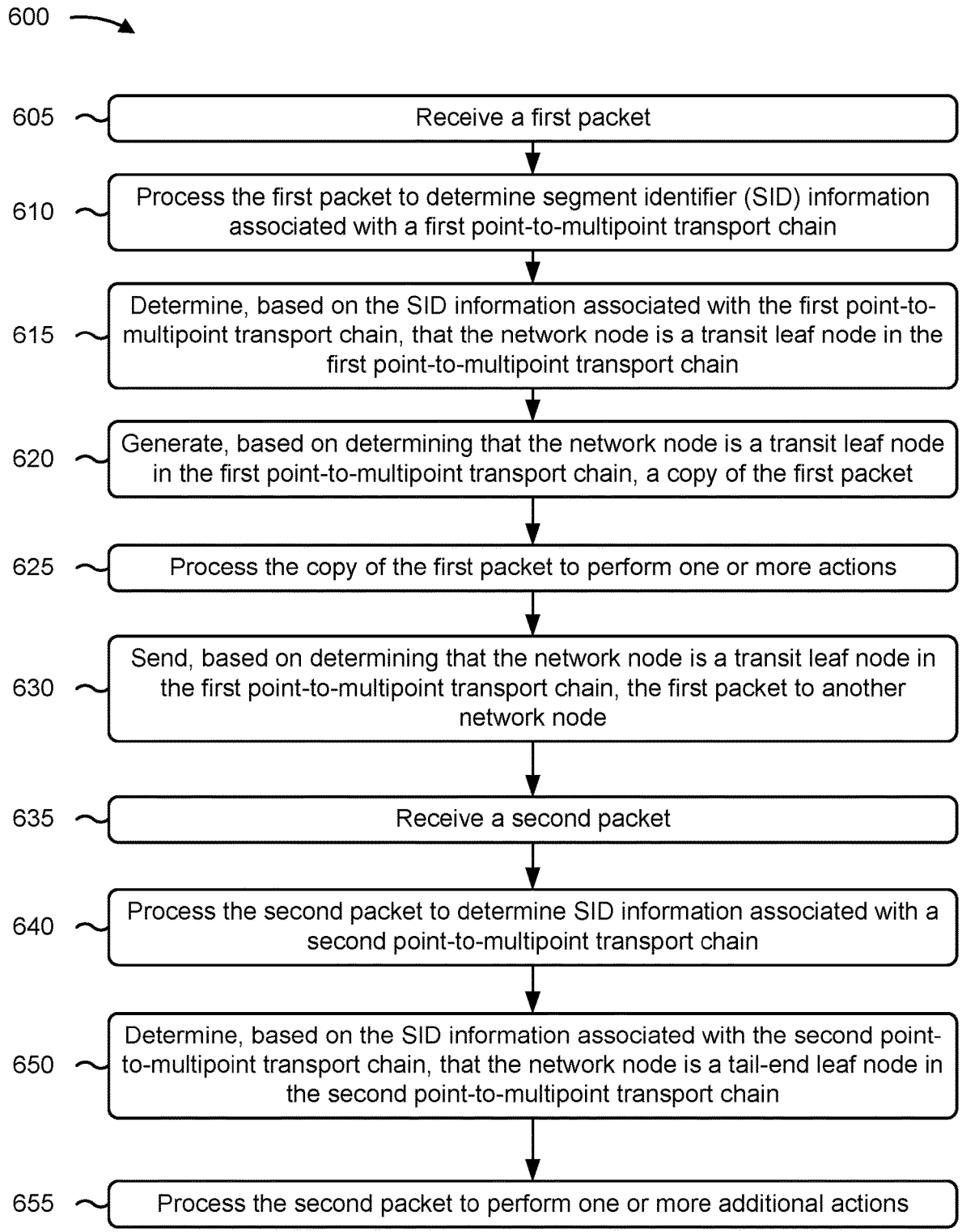

FIG. 6 is a flow chart of an example process 600 for utilizing a point-to-multipoint transport chain. In some implementations, one or more process blocks of FIG. 6 may be performed by a network node (e.g., leaf network node 230). In some implementations, one or more process blocks of FIG. 6 may be performed by another device or a group of devices separate from or including the network node, such as another network node (e.g., root network node 210 and/or transit network node 220).

As shown in FIG. 6, process 600 may include receiving a first packet (block 605). For example, the network node (e.g., using processor 310, memory 315, storage component 320, input component 325, output component 330, communication interface 335, input component 355, switching component 360, output component 365, controller 370, and/or the like) may receive a first packet, as described above.

As further shown in FIG. 6, process 600 may include processing the first packet to determine segment identifier (SID) information associated with a first point-to-multipoint transport chain (block 610). For example, the network node (e.g., using processor 310, memory 315, storage component 320, input component 325, output component 330, communication interface 335, input component 355, switching component 360, output component 365, controller 370, and/or the like) may process the first packet to determine segment identifier (SID) information associated with a first point-to-multipoint transport chain, as described above.

As further shown in FIG. 6, process 600 may include determining, based on the SID information associated with the first point-to-multipoint transport chain, that the network node is a transit leaf node in the first point-to-multipoint transport chain (block 615). For example, the network node (e.g., using processor 310, memory 315, storage component 320, input component 325, output component 330, communication interface 335, input component 355, switching component 360, output component 365, controller 370, and/or the like) may determine, based on the SID information associated with the first point-to-multipoint transport chain, that the network node is a transit leaf node in the first point-to-multipoint transport chain, as described above.

As further shown in FIG. 6, process 600 may include generating, based on determining that the network node is a transit leaf node in the first point-to-multipoint transport chain, a copy of the first packet (block 620). For example, the network node (e.g., using processor 310, memory 315, storage component 320, input component 325, output component 330, communication interface 335, input component 355, switching component 360, output component 365, controller 370, and/or the like) may generate, based on determining that the network node is a transit leaf node in the first point-to-multipoint transport chain, a copy of the first packet, as described above.

As further shown in FIG. 6, process 600 may include processing the copy of the first packet to perform one or more actions (block 625). For example, the network node (e.g., using processor 310, memory 315, storage component 320, input component 325, output component 330, communication interface 335, input component 355, switching component 360, output component 365, controller 370, and/or the like) may process the copy of the first packet to perform one or more actions, as described above.

As further shown in FIG. 6, process 600 may include sending, based on determining that the network node is a transit leaf node in the first point-to-multipoint transport chain, the first packet to another network node (block 630). For example, the network node (e.g., using processor 310, memory 315, storage component 320, input component 325, output component 330, communication interface 335, input component 355, switching component 360, output component 365, controller 370, and/or the like) may send, based on determining that the network node is a transit leaf node in the first point-to-multipoint transport chain, the first packet to another network node, as described above.

As further shown in FIG. 6, process 600 may include receiving a second packet (block 635). For example, the network node (e.g., using processor 310, memory 315, storage component 320, input component 325, output component 330, communication interface 335, input component 355, switching component 360, output component 365, controller 370, and/or the like) may receive a second packet, as described above.

As further shown in FIG. 6, process 600 may include processing the second packet to determine SID information associated with a second point-to-multipoint transport chain (block 640). For example, the network node (e.g., using processor 310, memory 315, storage component 320, input component 325, output component 330, communication interface 335, input component 355, switching component 360, output component 365, controller 370, and/or the like) may process the second packet to determine SID information associated with a second point-to-multipoint transport chain, as described above.

As further shown in FIG. 6, process 600 may include determining, based on the SID information associated with the second point-to-multipoint transport chain, that the network node is a tail-end leaf node in the second point-to-multipoint transport chain (block 645). For example, the network node (e.g., using processor 310, memory 315, storage component 320, input component 325, output component 330, communication interface 335, input component 355, switching component 360, output component 365, controller 370, and/or the like) may determine, based on the SID information associated with the second point-to-multipoint transport chain, that the network node is a tail-end leaf node in the second point-to-multipoint transport chain, as described above.

As further shown in FIG. 6, process 600 may include processing the second packet to perform one or more additional actions (block 650). For example, the network node (e.g., using processor 310, memory 315, storage component 320, input component 325, output component 330, communication interface 335, input component 355, switching component 360, output component 365, controller 370, and/or the like) may process the second packet to perform one or more additional actions, as described above.

Process 600 may include additional implementations, such as any single implementation or any combination of implementations described below and/or in connection with one or more other processes described elsewhere herein.

In a first implementation, the first packet and the second packet originated from a root network node.

In a second implementation, alone or in combination with the first implementation, the first packet and the second packet are different types of segment routing packets.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network node, a packet that originated from a root network node;
   processing, by the network node, the packet to determine segment identifier (SID) information associated with a point-to-multipoint transport chain,
      wherein the network node is configured to handle different types of segment routing packets;
   determining, by the network node and based on the SID information, that the network node is a transit leaf node in the point-to-multipoint transport chain;

generating, by the network node and based on determining that the network node is a transit leaf node in the point-to-multipoint transport chain, a copy of the packet,
  wherein the network node processes the copy of the packet and forwards the packet to another network node;
processing, by the network node, the copy of the packet to perform one or more actions,
  wherein the one or more actions include causing one or more settings of the network node to be adjusted;
updating, by the network node and based on determining that the network node is a transit leaf node in the point-to-multipoint transport chain, the SID information; and
sending, by the network node and after updating the SID information, the packet, with the updated SID information, to the other network node.

2. The method of claim 1, wherein determining that the network node is a transit leaf node in the point-to-multipoint transport chain comprises:
  determining that an active SID of the SID information matches a SID associated with the network node;
  determining, based on determining that the active SID of the SID information matches the SID associated with the network node, that the SID information includes at least one additional SID; and
  determining, based on determining that the SID information includes at least one additional SID, that the network node is a transit leaf node.

3. The method of claim 1, wherein processing the copy of the packet to perform the one or more actions comprises:
  identifying copied SID information included in the copy of the packet;
  removing the copied SID information from the copy of the packet; and
  processing, after removing the copied SID information from the copy of the packet, the copy of the packet to perform the one or more actions.

4. The method of claim 1, wherein updating the SID information comprises:
  identifying an active SID of the SID information; and
  removing the active SID from the SID information.

5. The method of claim 1, wherein the packet is a segment routing multiprotocol label switching (SR-MPLS) packet and the SID information comprises one or more labels associated with the point-to-multipoint transport chain that are included in a header of the packet,
  wherein determining that the network node is the transit leaf node comprises:
    identifying an active label, of the one or more labels;
    determining that the active label identifies a SID that matches a SID associated with the network node; and
    determining, after determining that the active label identifies a SID that matches the SID associated with the network node, that the network node is the transit leaf node based on a bottom-of-stack identifier included in the active label.

6. The method of claim 1, wherein the copy of the packet is a segment routing multiprotocol label switching (SR-MPLS) packet,
  wherein processing the copy of the packet to perform the one or more actions comprises:
    identifying a header of the copy of the packet that includes one or more labels associated with the point-to-multipoint transport chain;
    removing the header from the copy of the packet; and
    processing, after removing the header from the copy of the packet, the copy of the packet to perform the one or more actions.

7. The method of claim 1, wherein the packet is a segment routing multiprotocol label switching (SR-MPLS) packet and the SID information comprises two or more labels associated with the point-to-multipoint transport chain that are included in a header of the packet,
  wherein determining that the network node is a transit leaf node comprises:
    identifying an active label and a next-active label of the two or more labels;
    determining that the active label identifies a SID that matches a SID associated with the network node;
    determining that the next-active label is not an end-of-chain label; and
    determining, based on determining that the active label identifies a SID that matches the SID associated with the network node and determining that the next-active label is not an end-of-chain label, that the network node is a transit leaf node.

8. The method of claim 1, wherein the copy of the packet is a segment routing multiprotocol label switching (SR-MPLS) packet,
  wherein processing the copy of the packet to perform the one or more actions comprises:
    identifying a header of the copy of the packet that includes two or more labels associated with the point-to-multipoint transport chain and at least one additional label;
    removing the two or more labels associated with the point-to-multipoint transport chain from the header of the copy of the packet; and
    processing, after removing the two or more labels associated with the point-to-multipoint transport chain from the header of the copy of the packet, the copy of the packet to perform the one or more actions.

9. The method of claim 1, wherein the packet is a segment routing Internet protocol version 6 (SRv6) packet and the SID information comprises one or more SIDs associated with the point-to-multipoint transport chain that are included in a segment routing header of the packet,
  wherein determining that the network node is a transit leaf node comprises:
    determining that an active SID of the segment routing header of the packet matches a SID associated with the network node;
    determining that the segment routing header of the packet includes at least one additional SID; and
    determining, based on determining that the active SID of the segment routing header of the packet matches the SID associated with the network node and determining that the segment routing header of the packet includes at least one additional SID, that the network node is a transit leaf node.

10. The method of claim 1, wherein the copy of the packet is a segment routing Internet protocol version 6 (SRv6) packet,
  wherein processing the copy of the packet to perform the one or more actions comprises:
    identifying a segment routing header of the copy of the packet;
    removing the segment routing header from the copy of the packet; and processing, after removing the segment routing header from the copy of the packet, the copy of the packet to perform the one or more actions.

11. A network node, comprising:
one or more memories; and
one or more processors to:
  receive a packet that originated from a root network node;
  process the packet to determine segment identifier (SID) information associated with a point-to-multipoint transport chain;
  determine, based on the SID information, that the network node is a tail-end leaf node in the point-to-multipoint transport chain,
    wherein the network node is configured to concurrently handle different types of segment routing packets; and
  process the packet to perform one or more actions,
    wherein the one or more actions comprise:
      causing one or more settings of the network node to be adjusted.

12. The network node of claim 11, wherein the one or more processors, when determining that the network node is a tail-end leaf node in the point-to-multipoint transport chain, are to:
  determine that an active SID of the SID information matches a SID associated with the network node;
  determine, based on determining that the active SID of the SID information matches the SID associated with the network node, that the SID information does not include any additional SIDs; and
  determine, based on determining that the SID does not include any additional SIDs, that the network node is a tail-end leaf node.

13. The network node of claim 11, wherein the one or more processors, when processing the packet to perform the one or more actions, are to:
  remove the SID information from the packet; and
  process, after removing the SID information from the packet, the packet to perform the one or more actions.

14. The network node of claim 11, wherein the packet is a segment routing multiprotocol label switching (SR-MPLS) packet and the SID information comprises one or more labels associated with the point-to-multipoint transport chain that are included in a header of the packet,
  wherein the one or more processors, when determining that the network node is a tail-end leaf node in the point-to-multipoint transport chain, are to:
    determine that an active label, of the one or more labels, identifies a SID that matches a SID associated with the network node;
    determine that an identifier included in the active label indicates that the active label is a last label in the header of the packet; and
    determine, after determining that the active label identifies a SID that matches the SID associated with the network node and determining that the identifier included in the active label indicates that the active label is the last label in the header of the packet, that the network node is a tail-end leaf node.

15. The network node of claim 11, wherein the packet is a segment routing multiprotocol label switching (SR-MPLS) packet and the SID information comprises two or more labels associated with the point-to-multipoint transport chain that are included in a header of the packet,
  wherein the one or more processors, when determining that the network node is a tail-end leaf node, are to:
    identify an active label and a next-active label of the two or more labels;
    determine that the active label identifies a SID that matches a SID associated with the network node;
    determine that the next-active label is an end-of-chain label; and
    determine, based on determining that the active label identifies a SID that matches the SID associated with the network node and determining that the next-active label is the end-of-chain label, that the network node is a tail-end leaf node.

16. The network node of claim 11, wherein the packet is a segment routing Internet protocol version 6 (SRv6) packet and the SID information comprises one or more SIDs associated with the point-to-multipoint transport chain that are included in a segment routing header of the packet,
  wherein the one or more processors, when determining that the network node is a tail-end leaf node, are to:
    determine that an active SID of the segment routing header of the packet matches a SID associated with the network node;
    determine that the segment routing header of the packet does not include any additional SIDs; and
    determine, based on determining that the active SID of the segment routing header of the packet matches the SID associated with the network node and determining that the segment routing header of the packet does not include any additional SIDs, that the network node is a tail-end leaf node.

17. A non-transitory computer-readable medium storing instructions, the instructions comprising:
one or more instructions that, when executed by one or more processors of network node, cause the one or more processors to:
  receive a first packet;
  process the first packet to determine segment identifier (SID) information associated with a first point-to-multipoint transport chain,
    wherein the network node is configured to handle different types of segment routing packets;
  determine, based on the SID information associated with the first point-to-multipoint transport chain, that the network node is a transit leaf node in the first point-to-multipoint transport chain;
  generate, based on determining that the network node is a transit leaf node in the first point-to-multipoint transport chain, a copy of the first packet,
    wherein the network node processes the copy of the first packet and forwards the first packet to another network node;
  process the copy of the first packet to perform one or more actions,
    wherein the one or more actions include causing one or more settings of the network node to be adjusted;
  send, based on determining that the network node is a transit leaf node in the first point-to-multipoint transport chain, the first packet to the other network node;
  receive a second packet;
  process the second packet to determine SID information associated with a second point-to-multipoint transport chain;
  determine, based on the SID information associated with the second point-to-multipoint transport chain, that the network node is a tail-end leaf node in the second point-to-multipoint transport chain; and process the second packet to perform one or more additional actions.

18. The non-transitory computer-readable medium of claim 17, wherein the first packet and the second packet originated from a root network node.

19. The non-transitory computer-readable medium of claim 17, wherein the first packet and the second packet are different types of segment routing packets.

20. The network node of claim 11, wherein the tail-end leaf node is a destination leaf network node of the point-to-multipoint transport chain.

* * * * *